United States Patent [19]

Hamil et al.

[11] 4,121,175

[45] Oct. 17, 1978

[54] GAS BEARING SUSPENDED ROTATING LASER WINDOW UNIT

[75] Inventors: Roy A. Hamil, Kirtland A.F.B., N. Mex.; Alfred L. Johnson, Manhattan Beach, Calif.

[73] Assignee: The United States of America as represented by the Secretary of the Air Force, Washington, D.C.

[21] Appl. No.: 756,942

[22] Filed: Jan. 5, 1977

[51] Int. Cl.² ............................................. H01S 3/02
[52] U.S. Cl. ............................. 331/94.5 D; 350/319
[58] Field of Search ................. 331/94.5 C, 94.5 D, 331/94.5 P; 350/62, 319

[56] References Cited

U.S. PATENT DOCUMENTS 3,103,712  9/1963  Allinikov et al. ..................... 350/319
3,790,289  2/1974  Schmidt ................................ 350/62

Primary Examiner—William L. Sikes
Attorney, Agent, or Firm—Joseph E. Rusz; Jacob N. Erlich

[57] ABSTRACT

A gas bearing suspended rotating laser window unit having a supporting structure adapted for mounting adjacent the aperture of a laser. The supporting structure rotatably suspends therein a laser window, the laser window being in optical alignment with the aperture of the laser. A gas bearing is utilized to suspend the window while a drive means provides the motive force necessary for the rotational movement of the window. In addition the gas bearing source or a secondary fluid source provides cooling of the laser window to take place during the rotation thereof in the supporting structure.

17 Claims, 6 Drawing Figures

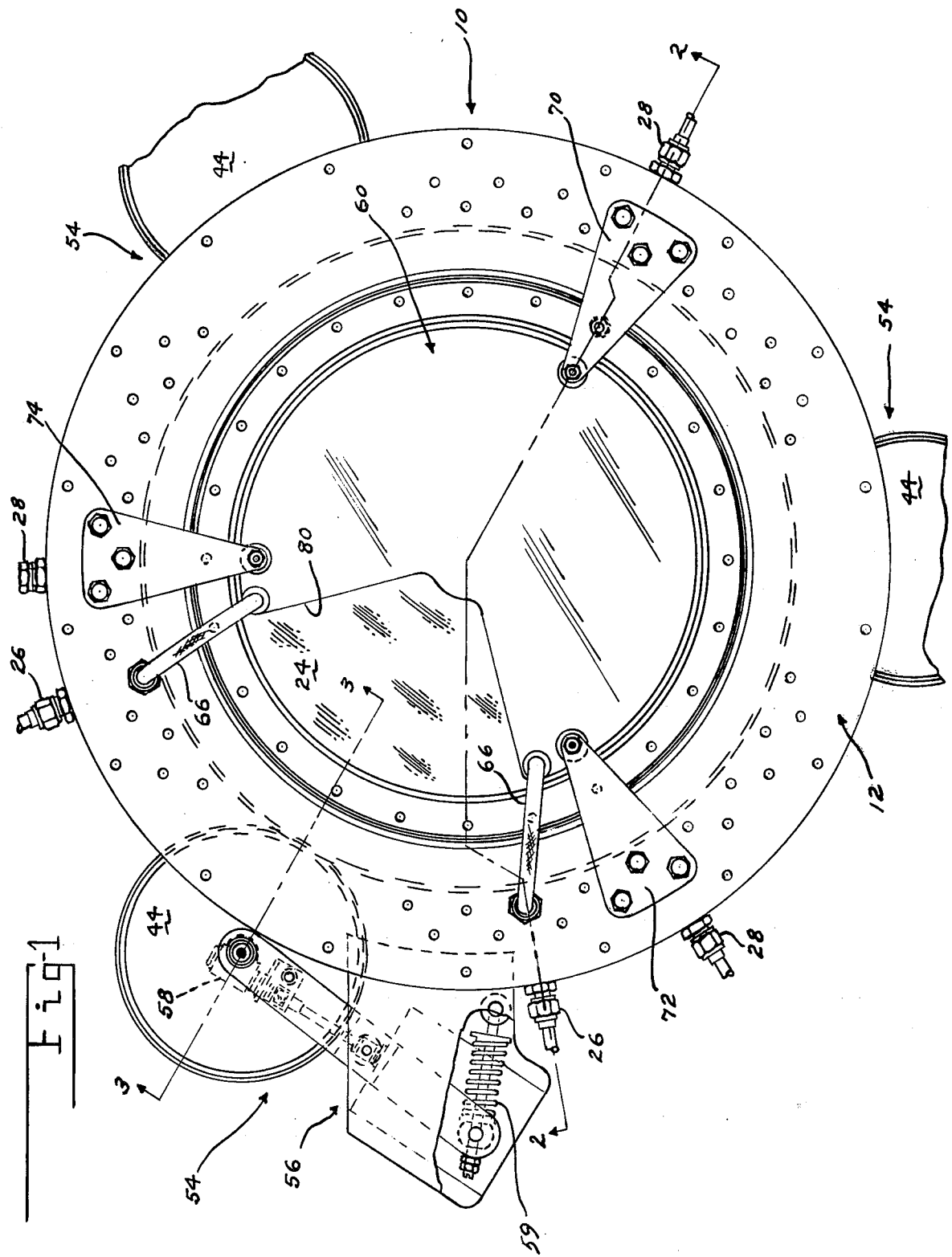

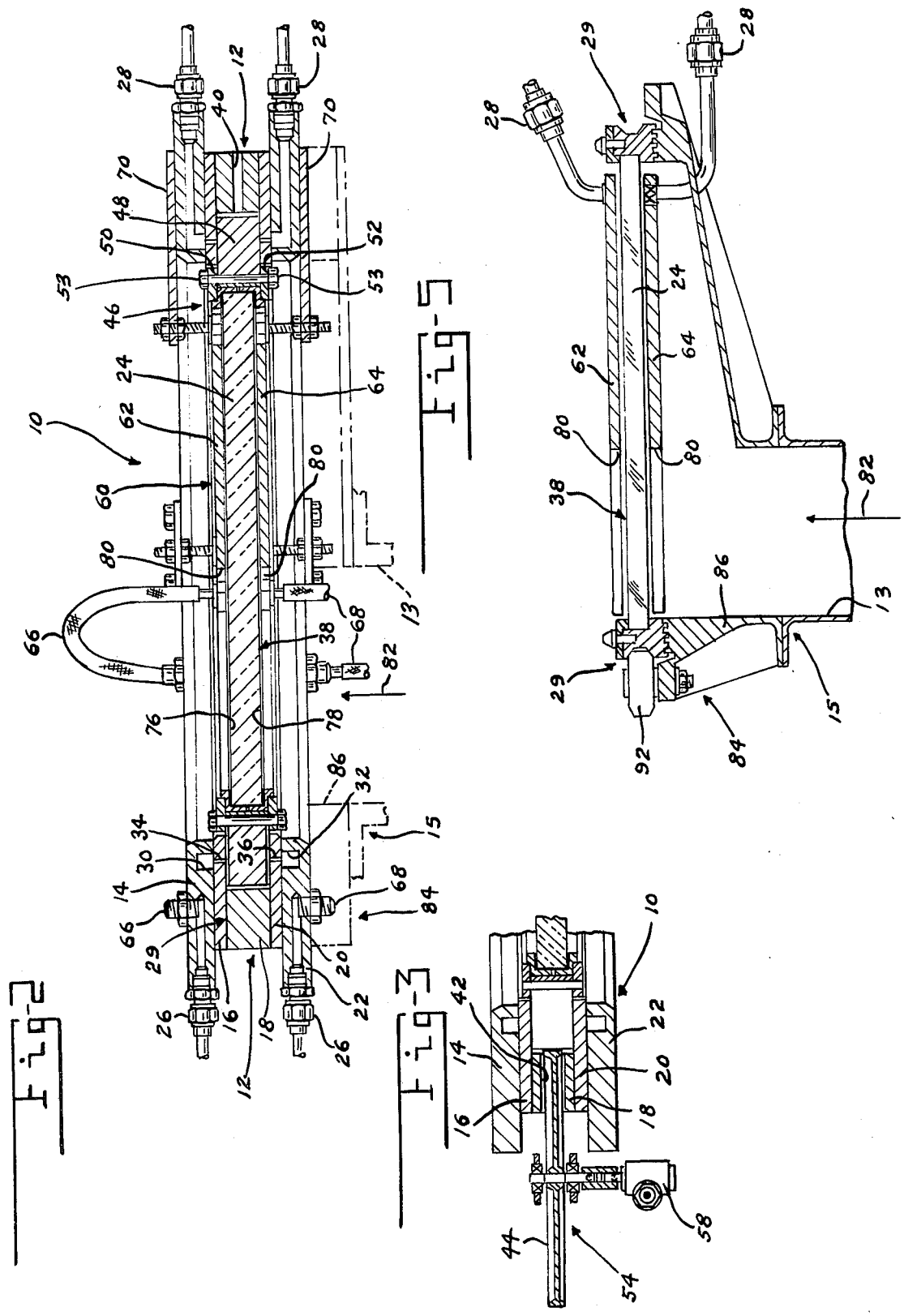

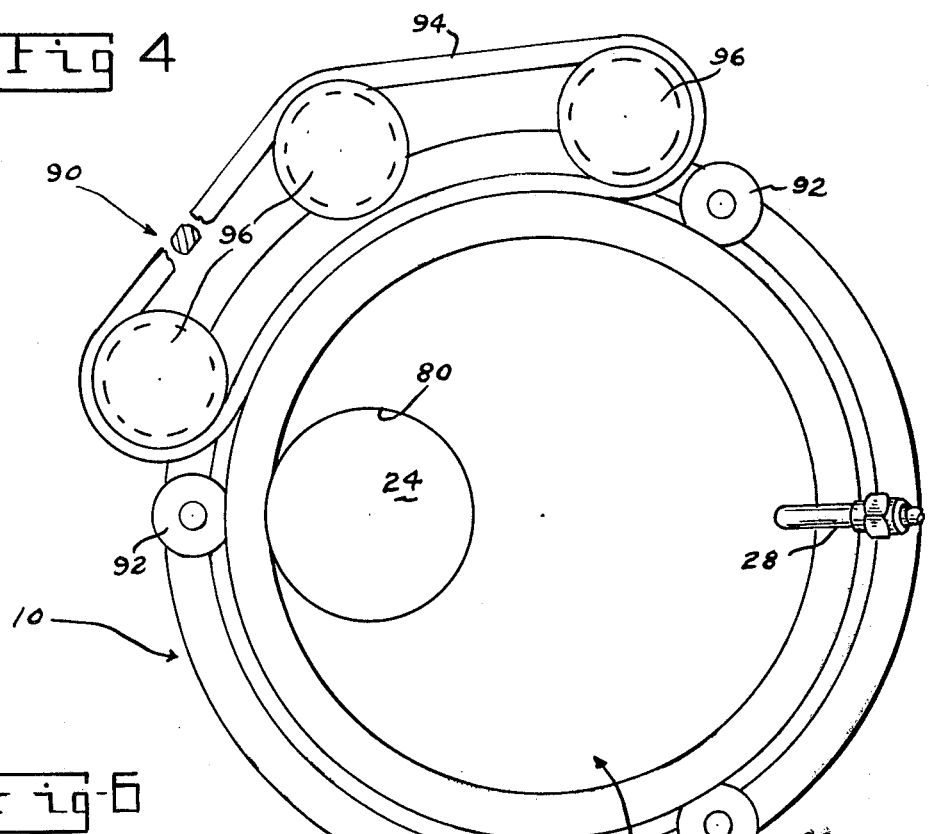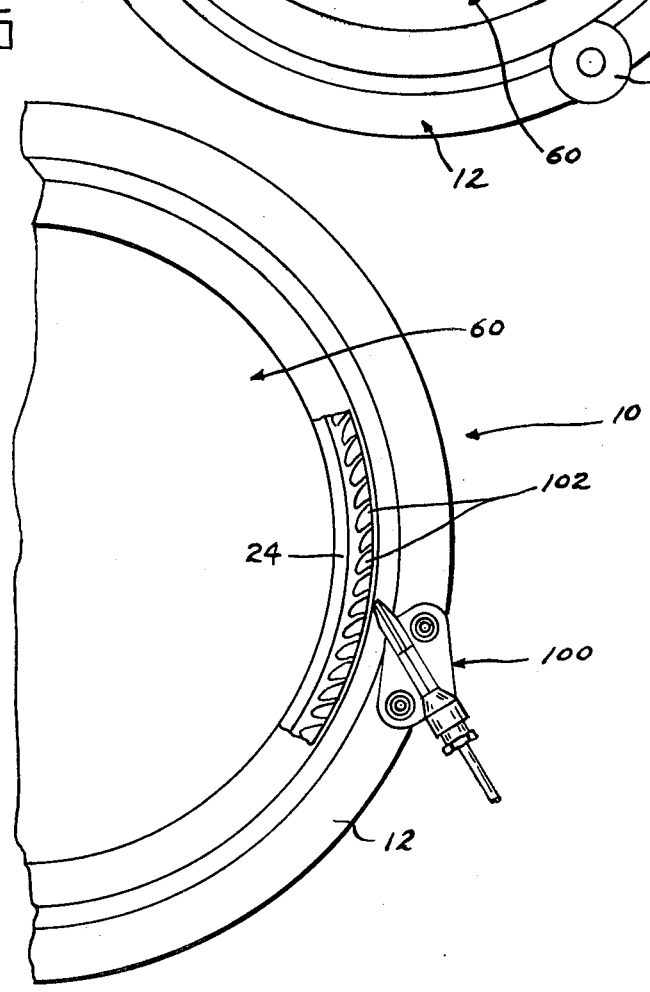

GAS BEARING SUSPENDED ROTATING LASER WINDOW UNIT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to laser windows, and, more particularly, to a high energy rotating laser window suspended by a gas bearing.

Since the development of the first working lasers, considerable time and effort has been expended in the search for higher output laser systems. The possible applications of high power lasers are unlimited in the fields of communication, manufacturing, construction, medicine, space exploration and defense. Unfortunately many obstacles exist to the attainment of high power systems. One such obstacle is found in the utilization of conventional laser windows.

A high-power laser system requires one or more windows to maintain separation of the fluids in the optical cavity from the external environment while allowing the unobstructed transmission of the intense electromagnetic radiation beam. This presents a design problem because the transparency of existing materials to the laser radiation wave lengths is less than perfect and even a very low percentage absorption of the beam will, in a few seconds, produce temperature gradients and deformations which cause unacceptable optical distortions or potentially excessive thermal stresses.

Apertures which physically separate the lasing media from the ambient while allowing the transmission of the desired electromagnetic excitation produced by the device are fundamental elements of a laser system. The most obvious aperture is a window fabricated from a material transparent to the wavelength of interest. Besides being transparent, the material must exhibit mechanical properties sufficient to withstand the stresses resulting from the specific design installation, and must also be relatively inert with regard to the fluids in contact with the material surfaces. Actually all material appear to exhibit some absorption regardless of the wavelength of interest, although for some materials the absorption coefficient is quite small. Unfortunately, the materials with low absorption coefficients tend to have poor mechanical properties. Thus, windows for laser systems are fabricated from materials possessing a compromised combination of properties. For windows transmitting relatively low light flux densities, no problem results; however, for windows transmitting relatively high light flux densities, the absorption can be sufficient to either melt or cause thermal fracture of the window.

It would be desirable, if possible, to cool the fixed window so that a thermal failure will not occur. Unfortunately, this may not be sufficient since non-destructive thermal distortion can be sufficient to cause optical distortions which could be sufficient to seriously reduce optical qualities of the emitted light beam. Currently considered as a possible solution to the above problems is the use of an "aerodynamic window" which permits an unobstructed opening by maintaining the pressure between the two cavities at a required differential. This is accomplished by a shock wave established at the exit plane by a high flow rate of gas through a convergent/divergent nozzle. The obvious disadvantage of this solution is the energy needed to provide the gas flow requirements which is quite significant. For a usable laser aperture, an aerodynamic window would require the equivalent of 800hp.

SUMMARY OF THE INVENTION

The instant invention overcomes the problems set forth in detail hereinabove by providing a gas bearing suspended rotating laser window unit. This invention employs a rotating material window transmitting to the particular radiation used, the window having a diameter substantially larger than required for transmission of the laser beam. The entire window is suspended as an air bearing, with the rotational power being supplied to the window by a variety of drive mechanisms.

For example, the window may use an air bearing to support both axial and radial loads and be driven by compressed air reacting on turbine-like blades located on the outer perimeter of the window. Another design would also incorporate therein fixed roller bearings located equidistant around the outer perimeter of the window while the drive means is in the form of a capstan belt drive. The third, and perhaps the most efficient unit, would utilize a plurality of spaced wheels for radial support of the window, with these wheels also provided with the drive capability.

In all these cases the window of this invention is provided with an air bearing support which in addition to providing support of the window also provides the cooling required for high power laser operation. As a result thereof the rotating laser window unit of this invention is acceptable to continuous or pulsed laser operation as well as capable of accepting weak crystals in the manufacture thereof since the air bearing provides virtually stress-free support. In addition, no point heating of the window takes place since the window is continually in motion thereby increasing the heat transfer coefficient to 300-400 or more. It should be additionally pointed out that although this invention finds its main utility in laser windows, the window units of this invention should be construed as a broad enough in scope to also include rotating mirrors, both completely and partially reflective, and the like.

It is therefore an object of this invention to provide a laser window unit in which the window is supported as an air bearing.

It is another object of this invention to provide a laser window unit in which the window is continuously rotated during laser operation.

It is a further object of this invention to provide a laser window unit capable of use within extremely high power lasers.

It is still another object of this invention to provide a laser window unit in which the window can be manufactured from weak crystalline materials.

It is a still further object of this invention to provide a laser window unit capable of use within a continuous or pulsed laser.

It is still a further object of this invention to provide a laser window unit which is economical to produce, reliable in operation and which utilizes conventional, currently available components in the manufacture thereof.

For a better understanding of the present invention together with other and further objects thereof reference is made to the following description taken in conjunction with the accompanying drawing and its scope will be pointed out in the appended claims.

DESCRIPTION OF THE DRAWING

FIG. 1 is a plan view of the gas bearing suspended rotating laser window unit of this invention;

FIG. 2 is a cross-sectional side elevational view of the gas bearing suspended rotating laser window unit of this invention taken along lines 2—2 of FIG. 1;

FIG. 3 is a cross-sectional side elevational view of the gas bearing suspended rotational laser window unit of this invention taken along lines 3—3 of FIG. 1;

FIG. 4 is a plan view of a modified embodiment of the gas bearing suspended rotating laser window unit of this invention;

FIG. 5 is a side elevational view of the modified gas bearing suspended rotating laser window unit of this invention shown in FIG. 4, shown partly in cross-section; and FIG. 6 is a plan view of a segment of another modified embodiment of the gas bearing suspended rotating laser window unit of this invention.

DETAILED DESCRIPTION OF THE PREFERRED EMBODIMENT

Reference is now made to FIGS. 1 and 2 of the drawing which best illustrate the gas bearing suspended rotating laser window unit 10 of this invention. Laser window unit 10 is made up of a fixed outer structure 12 which is attached by any suitable securing means adjacent the aperture 13, of, preferably, any conventional gas laser 15. Outer structure 12 is generally of a cylindrical configuration, although not limited thereto, and is in the form of a plurality of rings 14, 16, 18, 20 and 22. These rings, made preferably of aluminum, are secured together by any suitable securing means such as bolts thereby forming the fixed outer structure 12 which rotatably mounts therein a laser window 24 in a manner to be described in detail hereinbelow. Although window 24 may also take the form of any partially or totally reflective material, the general window material would be zinc solenide or Irtran.

Rings 14 and 22 form the outer rings of the structure 12 of the rotating laser window unit 10 of this invention and incorporates therein any suitable fittings 26 for the supply and return of coolant fluid such as air and fittings 28 for the supply of air to the laser window bearing 29. It should be noted that any suitable liquid coolant as well as air can be supplied to fittings 26 in order to cool laser window 24. An annulus 30 and 32, respectively, is machined around the inner surface of outer rings 14 and 22, respectively. Annulus 30 and 32 provide the means for distributing the pressurized air to the system. An inner pair of rings 16 and 20 form the outer race of air bearing 29 and by a series of axially drilled passageways 34 and 36 provide distribution of the pressurized air around bearing 29. Clearance for the rotating assembly 38, described hereinbelow, is provided by center ring 18. A series of passages 40 through the perimeter of center ring 18 provides radial venting of the bearing air. In addition, three radial passages 42 (best shown in FIG. 3 of the drawing) are also machined in center ring 18 to provide access for drive wheels 44 which engage the outer perimeter of rotating assembly 38 in a manner to be described in detail hereinbelow.

The rotational assembly 38 of the laser window unit 10 of this invention is made up of a support 46 preferably in the form of a plurality of machined rings 48, 50 and 52 which are held together by any suitable securing means such as bolt 53 to form a frame which supports the laser window 24. In addition, a split retaining ring 53 is bonded directly to the laser window 24 by any suitable securing means such as by a film of RTV. Ring 53 is not part of the supporting structure but may be formed as an integral part of the laser window material 24 if desired.

The drive means 54 for the rotating laser window unit 10 of this invention is best shown in FIGS. 1 and 3 of the drawing. Drive means 54 is made up of a plurality of motor driven wheel subassemblies 56, preferably three in number, which are mounted by any suitable securing means such as bolts to the outer structure 12 of the laser window unit 10. Wheel subassemblies 56 have formed as a part thereof drive wheels 44 which by friction engage the outer perimeter of the rotating assembly 38 through the three radial passages 42 (shown in FIG. 3) and provided in the fixed center ring 18. Although any drive mechanism may be utilized with this invention a conventional one-half horsepower series wound universal motor 58 with any conventional drive assembly can be used. Furthermore, this drive mechanism may take the form of any commerically available pneumatic drive or the like.

Two of the drive wheels 44 have an adjustment (not shown) which is fixed once the rotating assembly 38 is centered while the third drive wheel 44 has an adjustable spring tensioner 59 to preload the friction drive. A conventional depth gauge in conjunction with the radial vent passages 40 in center ring 18 of the fixed structure 12 assembly can be used to insure that the rotating assembly 38 is properly centered.

Located on opposite sides of laser window 24 is a cold plate subassembly 60 formed of two identical plates 62 and 64. Plates 62 and 64 are mounted on the fore and aft side of fixed structure 12 having a pair of flexible inlet and outlet connections 66 and 68, respectively, attached between plates 62 and 64 and fixtures 26 in the outer ring 14 and 22, respectively, of fixed structure 12. Plates 62 and 64 are adjustably mounted by means of three pairs of support brackets 70, 72 and 74 so as to provide an air gap 76 and 78 between the rotating assembly 38 and the plates 62 and 64, respectively. In addition, each plate 62 and 64 has a cutout portion 80 provided in one corner section thereof which allows for an incoming laser beam 82 to be focused on the rotating laser window 24.

The entire fixed structure 12 is mounted by any suitable support means 84, shown in phantom in FIG. 2 of the drawing adjacent aperture 13 of laser 15 so that the emitted laser beam 82 is in alignment with an opening 86 within structure 84 and the corresponding openings 80 within plates 62 and 64, respectively.

During operation the rotating assembly 38, including laser window 24 is suspended by air bearing surface 29 which provides the proper axial support for laser window 24. Rotational force is provided by drive means 54, which in this embodiment takes the form of a frictional drive wheel 44, but which may take the form of other drive means which are set forth and described in detail hereinbelow. The utilization of an air bearing support not only provides a substantially frictionless support for laser window 24 but also, along with support 46 substantially reduces any damage during operation to an extremely fragile window 24. In addition the air (if a specific coolant is not used) provides through connections 66 and 68 a constant cooling of laser window 24 to take place. By the continual rotation of laser window 24 any uninterrupted heating of the laser window 24 is prevented from taking place.

Reference is now made to the remaining Figures of the drawing (FIGS. 4–6) which illustrate alternate embodiments of the gas bearing suspended rotating laser window unit 10 of this invention. Specifically, these embodiments disclose alternate driving mechanisms for use within the laser window unit 10. In the description set forth hereinbelow, for purposes of clarity, the embodiments illustrated in FIGS. 4–6, omit many of the details set forth in FIGS. 1–3, however, it should be realized that those elements shown in FIGS. 1–3 are all adaptable to FIGS. 4–6. In addition, elements performing like or substantially identical operations will be designated with similar numerals in all Figures of the drawing.

Reference is now made particularly to FIGS. 4 and 5 of the drawing in which a modified drive means 90 for rotating laser window 24 of the laser window unit 10 of this invention is provided. In the embodiment shown in FIGS. 4 and 5 of the drawing all elements shown which are similar to those described with respect to FIGS. 1–3 are basically of the same configuration with the exception that the rotating assembly 38 is supported by three fixed roller bearings 92 located equadistance about assembly 38 and thereby supplying the radial support for assembly 38. The driving means 90 is in the form of a capstan drive belt 94 in operational engagement with a plurality of drive wheels 96. Capstan drive belt 94 frictionally engages the outer surface or perimeter of rotating laser window 24. The remainder of the embodiment shown in FIGS. 4 and 5, that is, the axial support of assembly 38 is identical to that shown in FIGS. 1–3 of the drawing in which a fluid source is utilized in conjunction with air bearing 29 and a pair of plates 62 and 64 for cooling thereof as well as axial support thereof. As with the rotating window 24 shown in FIGS. 1–3 an incoming laser beam 82 focuses upon the laser window 24.

FIG. 6 shows another embodiment of the gas bearing suspended rotating window laser 10 of this invention. This embodiment utilizes an air bearing not only to support the axial load of rotating assembly 38, but also to support the radial load thereof. In addition, compressed air is fed through at least one air inlet 100 which directs this flow against the periphery of the laser window 24 in order to drive assembly 38 in a manner similar to that described hereinabove with respect to FIGS. 1–5. Furthermore, the outer periphery of rotating assembly 38 may have formed therein a plurality of turbine-like blade indentations 102 so as to increase the rotational force provided by the air from inlet 100.

Although this invention has been described with reference to a variety of embodiments, it will be understood to those skilled in the art that this invention is also capable of a further variety of alternate embodiments within the spirit and scope of the appended claims.

We claim:

1. A laser window unit comprising a supporting structure, means for transmitting a beam of radiation focused thereupon, a gas bearing, said gas bearing rotatably suspending said radiation transmitting means within said supporting structure, means for providing a motive force to said radiation transmitting means thereby causing the rotational movement thereof within said supporting structure and means for cooling said radiation transmitting means during the rotational movement thereof.

2. A laser window unit as defined in claim 1 further comprising means for transferring said motive force to said radiation transmitting means operably interposed between said means for providing said motive force to said radiation transmitting means and said radiation transmitting means.

3. A laser window unit as defined in claim 2 wherein said cooling means comprises a pair of plates, means operatively connecting said pair of plates to said supporting structure, each of said plates located adjacent opposite sides of said radiation transmitting means and spaced a predetermined distance away from said radiation transmitting means and means for providing a coolant to flow between said space between said plates and said radiation transmitting means.

4. A laser window unit as defined in claim 3 wherein each of said plates has an opening therein, said openings being in optical alignment with said beam of radiation.

5. A laser window unit as defined in claim 4 wherein said means for providing a motive force to said radiation transmitting means comprises at least one roller and means for driving said roller.

6. A laser window unit as defined in claim 4 wherein said means for providing a motive force to said radiation transmitting means comprises at least one belt and means for driving said belt.

7. A laser window unit as defined in claim 4 wherein said means for providing a motive force to said radiation transmitting means comprises means for directing fluid under pressure against said motive force transferring means.

8. A laser window unit as defined in claim 4 wherein said radiation transmitting means is made of a crystalline structure.

9. A laser window unit as defined in claim 8 wherein said means for supporting said plates is adjustable.

10. In a laser having an aperture therein, the improvement therein being a laser window unit, said laser window unit comprising a supporting structure, means in optical alignment with said laser aperture for transmitting a beam of radiation emanating from said aperture, means for rotatably suspending said radiation transmitting means within said supporting structure, means for providing a motive force to said radiation transmitting means thereby causing the rotational movement thereof within said supporting structure and means for cooling said radiation transmitting means during the rotational movement thereof.

11. In a laser as defined in claim 10 wherein said suspending means is in the form of a gas bearing.

12. In a laser as defined in claim 11 further comprising means for transferring said motive force to said radiation transmitting means operably interposed between said means for providing said motive force to said radiation transmitting means and said radiation transmitting means.

13. In a laser as defined in claim 12 wherein said cooling means comprises a pair of plates, means operatively connecting said pair of plates to said supporting structure, each of said plates located adjacent opposite sides of said radiation transmitting means and spaced a predetermined distance away from said radiation transmitting means and means for providing a coolant to flow between said space between said plates and said radiation transmitting means.

14. In a laser as defined in claim 13 wherein each of said plates has an opening therein, said openings being in optical alignment with said beam of radiation.

15. In a laser as defined in claim 14 wherein said means for providing a motive force to said radiation transmitting means comprises at least one roller and means for driving said roller.

16. In a laser as defined in claim 14 wherein said means for providing a motive force to said radiation transmitting means comprises at least one belt and means for driving said belt.

17. In a laser as defined in claim 14 wherein said means for providing a motive force to said radiation transmitting means comprises means for directing fluid under pressure against said motive force transferring means.

* * * * *